(12) United States Patent
Albrecht et al.

(10) Patent No.: US 11,059,387 B2
(45) Date of Patent: Jul. 13, 2021

(54) METHOD FOR COOLING A TRACTION BATTERY OF AN ELECTRICALLY DRIVABLE VEHICLE, AND COOLING ARRANGEMENT FOR CARRYING OUT THE METHOD

(71) Applicant: VOLKSWAGEN AKTIENGESELLSCHAFT, Wolfsburg (DE)

(72) Inventors: Jan-Christoph Albrecht, Wolfsburg (DE); Carsten Wachsmuth, Schwülper (DE); Bastian Schaar, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 197 days.

(21) Appl. No.: 16/296,544

(22) Filed: Mar. 8, 2019

(65) Prior Publication Data
US 2019/0275911 A1    Sep. 12, 2019

(30) Foreign Application Priority Data
Mar. 8, 2018   (DE) .......................... 10 2018 203 537

(51) Int. Cl.
*B60L 58/26*     (2019.01)
*H01M 10/613*    (2014.01)
(Continued)

(52) U.S. Cl.
CPC .......... *B60L 58/26* (2019.02); *H01M 10/613* (2015.04); *H01M 10/617* (2015.04);
(Continued)

(58) Field of Classification Search
CPC . B60L 58/26; H01M 10/663; H01M 10/6568; H01M 10/633; H01M 10/617;
(Continued)

(56) References Cited

U.S. PATENT DOCUMENTS

| | | |
|---|---|---|
| 2003/0080714 A1 | 5/2003 | Inoue et al. |
| 2009/0249802 A1 | 10/2009 | Nemesh et al. |
| 2010/0147488 A1 | 6/2010 | Pierre et al. |
| 2011/0132580 A1 | 6/2011 | Herrmann et al. |
| 2012/0125032 A1 | 5/2012 | Graaf et al. |

(Continued)

FOREIGN PATENT DOCUMENTS

| | | |
|---|---|---|
| DE | 10 2009 015 653 A1 | 11/2009 |
| DE | 10 2008 027 293 A1 | 12/2009 |

(Continued)

OTHER PUBLICATIONS

Search report for German Patent Application No. 10 2018 203 537.7, dated Jan. 9, 2019.

*Primary Examiner* — Stewart A Fraser
(74) *Attorney, Agent, or Firm* — Pearl Cohen Zedek Latzer Baratz LLP

(57) ABSTRACT

In a method for cooling a traction battery of an electrically drivable vehicle, a refrigerant is used as cooling medium, and in a mass flow of specified magnitude is led along the traction battery through at least one channel. The at least one channel is in heat-conducting connection with the traction battery. It is proposed that an available cooling power ($P_V$) for cooling the traction battery is determined, wherein as a function of the available cooling power ($P_V$), the magnitude of the mass flow of the refrigerant is regulated in such a way that either no cooling power ($P_{actual}$) is delivered to the traction battery, or the delivered cooling power ($P_{actual}$) in each case assumes one of multiple cooling power stages (I, II) as a function of the available cooling power ($P_V$).

12 Claims, 5 Drawing Sheets

(51) Int. Cl.
*H01M 10/625* (2014.01)
*H01M 10/6569* (2014.01)
*H01M 10/663* (2014.01)
*H01M 10/6568* (2014.01)
*H01M 10/633* (2014.01)
*H01M 10/617* (2014.01)

(52) U.S. Cl.
CPC ....... *H01M 10/625* (2015.04); *H01M 10/633* (2015.04); *H01M 10/6568* (2015.04); *H01M 10/6569* (2015.04); *H01M 10/663* (2015.04)

(58) Field of Classification Search
CPC ............. H01M 10/613; H01M 10/625; H01M 10/6569
See application file for complete search history.

(56) References Cited

U.S. PATENT DOCUMENTS

| | | |
|---|---|---|
| 2012/0225341 A1 | 9/2012 | Major et al. |
| 2012/0297805 A1 | 11/2012 | Kamada et al. |
| 2016/0079637 A1 | 3/2016 | Nemesh et al. |
| 2016/0233565 A1 | 8/2016 | Weileder et al. |
| 2019/0237826 A1* | 8/2019 | Ida .................... H01M 10/627 |

FOREIGN PATENT DOCUMENTS

| | | |
|---|---|---|
| DE | 10 2009 029 629 A1 | 6/2010 |
| DE | 10 2011 053 894 A1 | 5/2012 |
| DE | 10 2013 225 521 A1 | 6/2015 |
| DE | 10 2015 115 148 A1 | 3/2016 |
| EP | 2 924 797 A1 | 9/2015 |

* cited by examiner

METHOD FOR COOLING A TRACTION BATTERY OF AN ELECTRICALLY DRIVABLE VEHICLE, AND COOLING ARRANGEMENT FOR CARRYING OUT THE METHOD

CROSS REFERENCE TO RELATED APPLICATION

This application claims priority from German Patent Application No. 10 2018 203 537.7, filed Mar. 8, 2018, which is incorporated herein by reference in its entirety.

FIELD OF THE INVENTION

The invention relates to a method for cooling a traction battery of an electrically drivable vehicle. The invention further relates to a cooling arrangement for carrying out the method.

BACKGROUND OF THE INVENTION

A method and a cooling arrangement have become known from DE 10 2013 225 521 A1. In particular, two cooling lines containing a refrigerant are led beneath multiple battery modules and absorb heat from the cells of the battery modules. The cooling lines extend perpendicularly with respect to the cells of the battery modules, with the flow direction of the refrigerant in the first line being opposite to a flow direction of the refrigerant in the second line. The heat that arises in the traction battery is removed by the refrigerant that is transported in the cooling lines. For this purpose, the cooling lines are led in a heat-conducting manner past the cells of the battery module to be cooled. In addition, it is proposed to connect multiple battery modules one behind the other in series. This may be achieved by a parallel course of the cooling lines that connects the battery modules, or also by a meandering course of the cooling lines that connects the battery modules. A parallel connection of the cooling lines is likewise disclosed.

DE 10 2009 029 629 A1 discloses a heat exchanger for temperature control for vehicle batteries, in which flat tubes that circulate in a rectangle form chambers that are used for accommodating battery units. A refrigerant that is distributed via a distributor tube and collected via a collection tube is conducted in the flat tubes. The refrigerant flows through the flat tubes in parallel in one direction. In addition, flow through adjacent flat tubes in the opposite direction is proposed.

Lastly, a device for cooling a battery module is also known from EP 2 924 797 A1. The battery module has multiple cells, the temperature of each cell being controlled via a temperature sensor. In addition, a cooling line in which a refrigerant is conducted passes through the battery module. The cooling line is fluidically segmentable by multiple valves. A control unit receives signals from the temperature sensors, wherein as a function of these signals, a drive unit for the refrigerant and the stated valves are controlled in such a way that the refrigerant flows in different ways through the battery module and cools it differently, depending on the temperature level.

A disadvantage of the current situation with these known refrigerant evaporative cooling systems is that undersupply of refrigerant results in temperature inhomogeneity within the refrigerant-conducting transport devices, which may be designed, for example, as lines, tubes, or the like. In particular, local overheating of the refrigerant due to complete evaporation may occur, resulting in inhomogeneity of the temperature of the battery cells. An associated temperature spread has an adverse effect on the performance and the service life of the battery cells. For this reason, refrigerant evaporative cooling of battery modules is generally used only when the thermal power from the traction battery is comparatively low overall. The required cooling power for cooling the traction battery is then usually available.

Future electrically drivable vehicles will have much greater electrical power and/or will require quick-charging functionalities. It is then to be expected that, without countermeasures, operating points lacking cooling power will accumulate, and load on the traction battery due to temperature spread will increase.

SUMMARY OF THE INVENTION

The object of the present invention, therefore, is to provide a method for cooling a traction battery of an electrically drivable vehicle in which uniform temperature control of the traction battery may be ensured, even when sufficient cooling power is not available for cooling the traction battery.

A further object of the invention is to provide a suitable cooling arrangement for carrying out the method.

The above objects are achieved with respect to the method by the features of certain independent claims, and with regard to the cooling arrangement, by the features of other independent claims.

Advantageous refinements and embodiments are set forth in the respective dependent claims. With regard to the technical method, the invention is directed to a method for cooling a traction battery of an electrically drivable vehicle, wherein a refrigerant is used as cooling medium, and in a mass flow of specified magnitude is led along the traction battery through at least one channel. The at least one channel may be designed, for example, as a pipe, a flat tube, or the like. The channel is in heat-conducting connection with the traction battery or with individual cells of the traction battery.

The invention proposes that initially an available cooling power for cooling the traction battery is determined. The available cooling power for cooling the traction battery is a function of the available overall cooling power and the required cooling power for cooling the passenger compartment. In particular, the available cooling power for cooling the traction battery is calculated from the difference between the available overall cooling power and the cooling power required for the passenger compartment.

Based on the determined available cooling power for cooling the traction battery, the magnitude of the mass flow of the refrigerant is then regulated in such a way that either no cooling power is delivered to the traction battery, or the delivered cooling power for the battery cooling in each case assumes one of multiple cooling power stages as a function of the available cooling power for the battery cooling.

In other words, cooling of the traction battery either does not take place at all, or takes place only in discrete power stages that are specified or are to be specified.

By use of such a method approach, the basis is provided for being able to control the location of overheating or complete evaporation of the refrigerant in the event of insufficient available cooling power for the battery cooling, and thus, to prevent temperature inhomogeneities within the battery module or within the battery cells.

The method may be refined in such a way that the available cooling power for the battery cooling is divided into multiple power ranges (in terms of control). A lower limit value is associated with each power range, each of the stated predetermined power stages corresponding to the lower limit value of a specific power range.

With a suitable design of the cooling arrangement for carrying out the method (see below), it may thus be ensured that complete evaporation, and thus associated overheating, of the refrigerant takes place only at locations where this may be accepted and does not result in a temperature spread within the battery module.

To simplify the method in terms of control, it is proposed that only three predetermined power stages may be assumed.

According to one very advantageous embodiment of the inventive concept, it is proposed to set the cooling power to be delivered in each case in the cooling power stages as a function of the temperature of the traction battery. In particular, with increasing battery temperature the values of the cooling power to be delivered in each case in a cooling power stage are increased.

However, this takes place in such a way that the ratio of the cooling power to be delivered in the cooling power stages always remains constant, for example is held at 1:2, 1:3, or 2:3. In other words, the lower limit values of the cooling power ranges are set as a function of the temperature of the traction battery, and are increased with increasing battery temperature.

Thus, it is not absolutely necessary to maintain a fixed temperature difference between the battery cells of the traction battery and the refrigerant. This may also contribute to simplification of the method.

In particular, it is advantageous when, according to another embodiment of the inventive concept, the available cooling power for the battery cooling is divided into three power ranges, as follows:
Power range 1: available cooling power<1 kW,
Power range 2: 1 kW<available cooling power<3 kW, and
Power range 3: available cooling power>3 kW The first power stage then does not cool the traction battery at all, the second power stage cools the traction battery with a cooling power of 1 kW, and the third power stage cools the traction battery with a cooling power of 3 kW.

By use of such a procedure, different operating points of a traction battery may be sufficiently covered, while keeping the outlay for control technology within limits.

As mentioned at the outset, a further aim of the invention is to provide a cooling arrangement for carrying out the method according to the invention.

The cooling arrangement includes a traction battery having multiple battery modules. Channels are present, through which a refrigerant is led along the battery modules, perpendicularly with respect to their longitudinal orientation. The channels are in heat-conducting connection with the battery modules or with battery cells within the battery modules. In addition, at least one first channel is present in which the refrigerant may be led along the battery modules in a first direction to at least one connecting element, and at least one second channel in which the refrigerant may be returned along the battery modules in a second direction. The directions and the channels are each oriented in parallel to one another, the stated connecting element fluidically connecting the channels to one another.

According to the invention, it is proposed that the cooling arrangement is operated or operable at least in an operating mode in which the traction battery is cooled solely in predetermined, discrete (i.e., separate) power stages. Thus, no continuous or constant change in the cooling power takes place; instead, the cooling takes place in stages at a specified power stage. In each cooling power stage, the refrigerant has either already completely evaporated in the area of the connecting element after being led through the at least one first channel, or is completely evaporated in the area of the connecting element, or is not evaporated until it has completely returned via the at least one second channel.

The cooling arrangement is thus optimally coordinated with the method, and the advantages of the method, namely, the ability to bring about spatially controlled overheating of the refrigerant and thus prevent a temperature spread, are achieved.

According to one refinement, it is proposed that the channels are each in heat-conducting connection with the battery modules of the traction battery via a heat-conducting contact surface in such a way that an area ratio of the total contact surface of the at least one supply channel to the total contact surface of the at least one return channel of 1:1, 1:2, or 2:1 results.

Such a refinement allows a practicable and application-oriented graduation of the cooling.

In terms of structure, this may be easily achieved for example, when the dimensions of each channel and of each battery module are the same, and the number of supply channels and the number of return channels are selected in such a way that a ratio of the supply channels to the return channels of 1:1, 1:2, or 2:1 results.

Such a refinement allows a practicable and application-oriented graduation of the cooling, i.e., with a very large number of identical parts.

It is thus conceivable, for example, for one supply channel and two return channels, or two supply channels and four return channels, etc., to be present. A cooling power ratio from 1 to 3 in the effective power stages may be achieved in this way.

Alternatively, it is conceivable for two supply channels and one return channel, or four supply channels and two return channels, etc., to be present. A cooling power ratio from 2 to 3 in the effective power stages is achieved by this embodiment.

If a cooling power ratio from 1 to 2 of the effective power stages should be appropriate, it is advantageous when the number of supply channels and the number of return channels is the same. Achieving other cooling power ratios is similarly conceivable.

To keep the control effort for the cooling device low, it is proposed that the traction battery in the stated operating mode is cooled solely in two power stages. For example, a first cooling power stage may cool the traction battery with a cooling power of 1 kilowatt, while a second power stage cools the traction battery with a cooling power of 3 kilowatts. Other gradations of the power stages are possible, as described above.

Lastly, a further aim is to provide protection under the present invention for an electrically drivable vehicle having a cooling arrangement according to the invention.

Preferred exemplary embodiments of the invention are illustrated in the figures and explained in greater detail in the following description, with reference to the figures, as the result of which even further advantages of the invention will become apparent. Identical, comparable, or functionally equivalent components are denoted by the same reference numerals, even in different figures. Corresponding or comparable properties and advantages are achieved, even when a repeated description or reference is not provided. The figures are not always true to scale. In some figures, proportions may be depicted in an exaggerated manner to allow clearer emphasis of features of an exemplary embodiment.

BRIEF DESCRIPTION OF THE DRAWINGS

In the figures, in each case schematically.

DETAILED DESCRIPTION OF THE INVENTION

Figure 1:
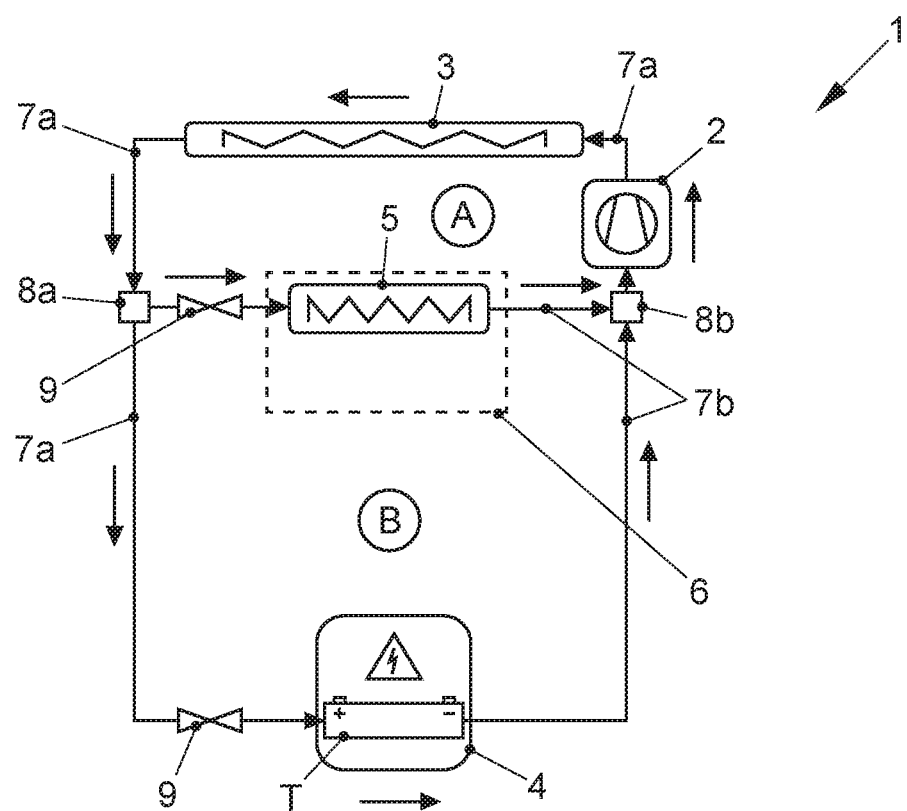
FIG. 1 shows a refrigerant circuit in a motor vehicle for carrying out the method according to the invention.
Figure 7:
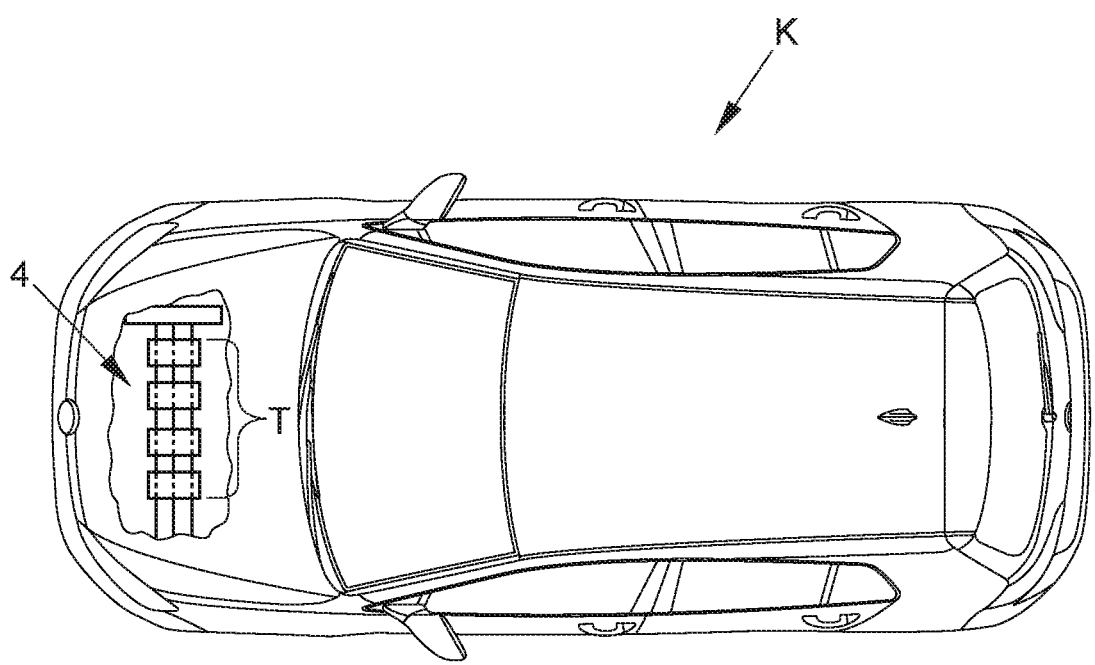
FIG. 7 shows an electrically drivable motor vehicle having a cooling arrangement for carrying out the method.

FIG. 1 shows a refrigerant circuit 1 of an electrically drivable motor vehicle K, not illustrated in greater detail (see FIG. 7).

The refrigerant circuit 1 includes a compressor 2 via which a refrigerant is driven and compressed, and a condenser 3, downstream from the compressor 2, in which the compressed refrigerant is cooled. The refrigerant flows through high-pressure cooling lines 7a to a first node point 8, in which the refrigerant is expanded via an expansion valve 9 and passes into an air conditioner 5 of the motor vehicle K. The air conditioner 5 is used to air condition a vehicle passenger compartment 6, indicated in dashed lines. The refrigerant subsequently passes through a low-pressure cooling line 7b to a second node point 8b, in which it is fed back to the compressor 2. An air conditioning circuit A is formed by the stated stations of the refrigerant.

The refrigerant that does not pass into the air conditioning circuit A at the node point 8a is routed via the high-pressure cooling line 7a to a second expansion valve 9 upstream from an evaporator 4, where it is expanded. The evaporator 4 is used for absorption of heat of a traction battery T, which results in evaporation of the refrigerant. The refrigerant is subsequently supplied via a low-pressure cooling line 7b to the node point 8b, and thus back to the compressor 2.

A battery cooling circuit B is formed by the node point 8a, the evaporator 4, and the node point 8b. An evaluation and control device, not illustrated in greater detail, is used to control the mentioned components of the refrigerant circuit 1 or of the air conditioning circuits A and B [sic; the air conditioning circuit A or the battery cooling circuit B] as necessary.

Figure 2:
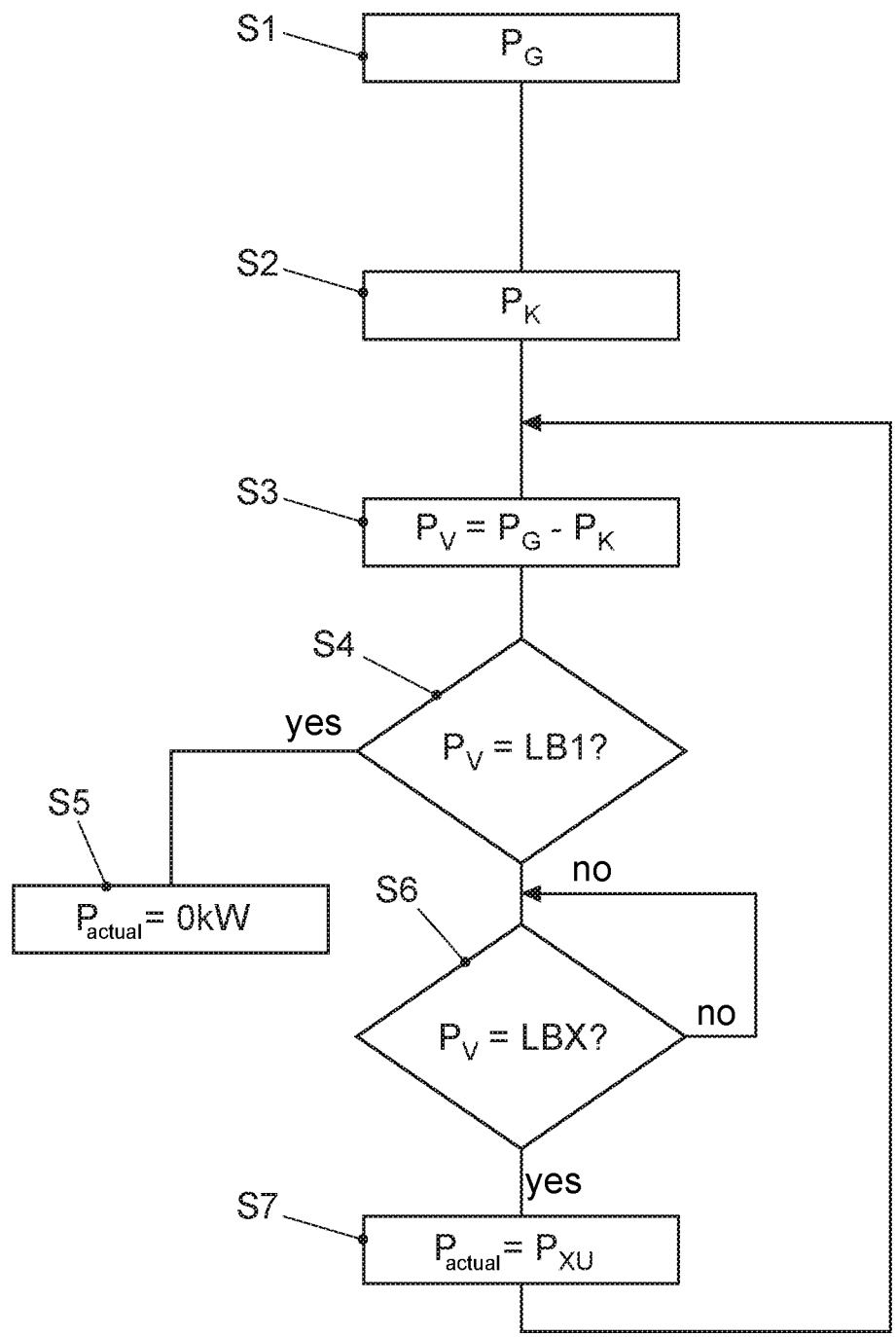
FIG. 2 shows a flow chart for explaining the basic concept of the method.

With reference to FIG. 2, it is now described, based on a flow chart, how a suitable evaluation and control device can control the refrigerant circuit 1, in particular the battery cooling circuit B.

Thus, an overall cooling power $P_G$ is initially determined in a step S1. The overall cooling power $P_G$ is a function, among other factors, of the external temperature, the quantity of air that is available to the front end of the motor vehicle K, and the allowed speed of the compressor 2.

An air conditioning cooling power $P_K$ that is necessary for air conditioning the vehicle passenger compartment 6 is determined in a step S2. The air conditioning cooling power $P_K$ is a function, among other factors, of the humidity and temperature of the air upstream from an air conditioner evaporator, a setpoint air blower temperature, and a setpoint air quantity for the vehicle passenger compartment.

An available cooling power $P_V$ for the battery cooling is calculated from the difference between the overall cooling power $P_G$ and the air conditioning cooling power $P_K$ in a step S3.

If it is determined in a step S4 that the available cooling power $P_V$ is within a lowest power range LB1, it is specified in a step S5 that a cooling power $P_{actual}$ with which the traction battery T is to be cooled is equal to zero kilowatts.

However, if it is determined in step S4 that the available cooling power $P_V$ is not in the lowest power range LB1, the particular power range LBX in which the available cooling power $P_V$ is in is determined in a step S6.

After determining the power range LBX in question, in a step S7 the cooling power $P_{actual}$ for cooling the traction battery T is set equal to a lower limit value $P_{XU}$ of the power in the power range LBX.

Figure 3:
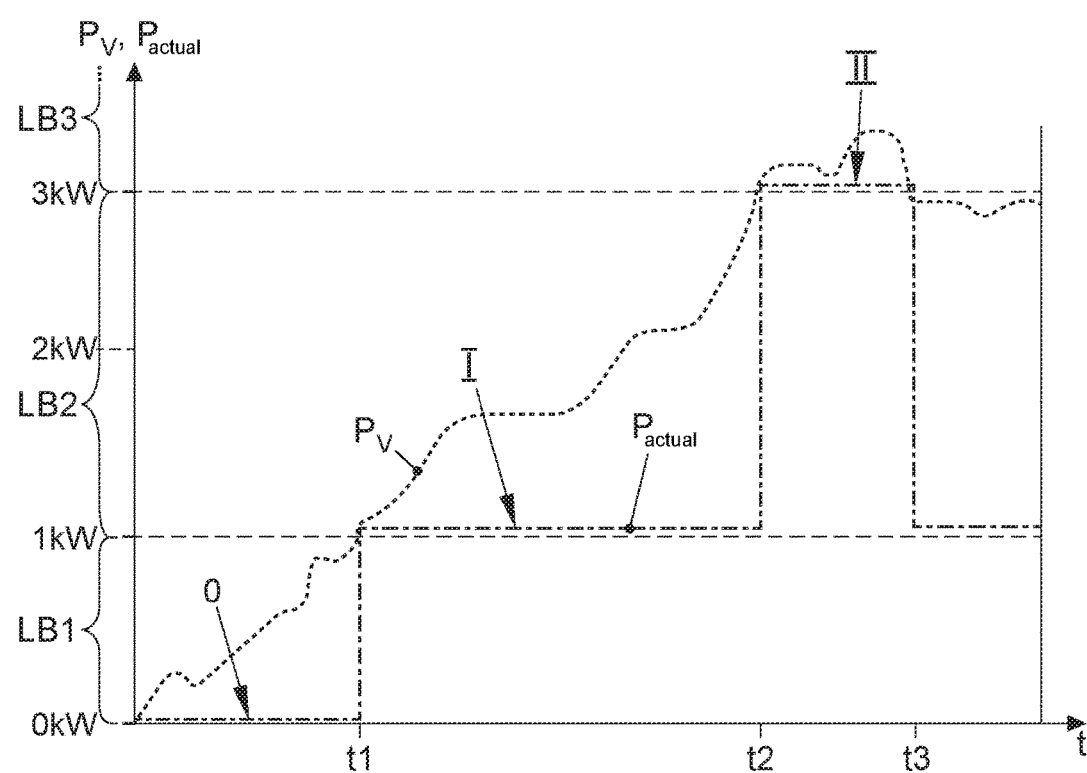
FIG. 3 shows another diagram for explaining the method according to the invention.

This procedure is explained once more with reference to FIG. 3, in a different presentation format. In the diagram, the available cooling power $P_V$ for the battery cooling, and the cooling power $P_{actual}$ with which the traction battery T is to be cooled, are plotted on the vertical axis. The time t is plotted on the horizontal axis.

Thus, in one specific embodiment of the method, a distinction is made among three power ranges LB1, LB2, and LB3 in terms of control. The first, lowest power range LB1 is in a range of the available cooling power $P_V$ of 0 kW to 1 kW. The second power range LB2 is in a range of the available cooling power $P_V$ of 1 kW to 3 kW, and the highest power range LB3 assumes values above 3 kW.

It is thus apparent that the available cooling power $P_V$ is in the power range LB1 up to a point in time t1. As a result, up to this point in time the cooling power $P_{actual}$ is set to 0 kW ("power stage" 0), i.e., corresponds to a lower limit value of the power in the power range LB1. Thus, in this operating state the traction battery T is not operated at all.

Beginning at point in time t1, the available cooling power $P_V$ reaches the power range LB2, so that the traction battery T is cooled in a cooling power stage I with a cooling power $P_{actual}$ of 1 kW beginning at point in time t1. This corresponds to the lower limit value of the available cooling power $P_V$ in the power range LB2.

This is continued until the determined available cooling power $P_V$ reaches the power range LB3 at point in time t2. At this point in time, the cooling power $P_{actual}$ for the battery cooling is set to the lower limit value of the available cooling power $P_V$ in the power range LB3. Thus, the traction battery T is then cooled in a cooling power stage II with a power of 3 kW.

The available cooling power $P_V$ drops back into the power range LB2 at a point in time t3. The control then results in the traction battery T once again being cooled at the lower limit value of the available cooling power $P_V$ in the power range LB2, i.e., with 1 kW.

In a departure from the specific limit values and the number of power ranges, other values and numbers are of course conceivable.

In particular, in a departure from the exemplary embodiment it is also conceivable to set the cooling power $P_{actual}$ to be delivered in each case in the cooling power stages I and II as a function of the temperature of the traction battery. In particular, the values of the cooling power $P_{actual}$ to be delivered in each case in a cooling power stage I, II are increased with increasing battery temperature. However, this takes place in such a way that the ratio of the cooling power $P_{actual}$ to be delivered in the cooling power stages I, II always remains constant, for example 1:2, 1:3, or 2:3.

In other words, the lower limit values of the cooling power ranges LB2 and LB3 are set as a function of the temperature of the traction battery, and are increased with increasing battery temperature.

Figure 4:
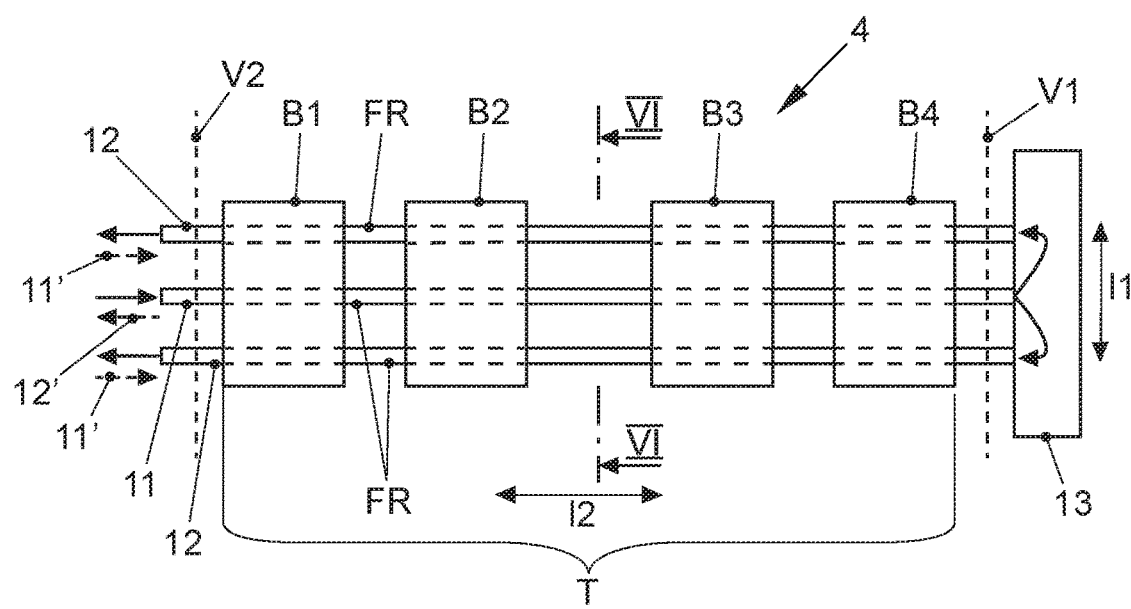
FIG. 4 shows a cooling arrangement for carrying out the method, in a first embodiment.

A first cooling arrangement that is coordinated with the method according to the invention is now presented with reference to FIG. 4. Thus, the cooling arrangement has an evaporator 4 that is formed from the channels 11, 12 for a refrigerant. The channels 11, 12 are held in heat-conducting contact with battery modules B1 through B4 of a traction battery T.

The battery modules B1 through B4 are designed in a known manner as cuboids having the same dimensions, with a longitudinal orientation I1. Each of the battery modules B1 through B4 has multiple battery cells (not illustrated in greater detail), which may preferably be Ni/MeH or Li-ion cells. These types of cells are particularly well suited as electrochemical energy stores. In the exemplary embodiment, the channels 11, 12 are an integral component of so-called flat tubes FR having a longitudinal orientation I2. Channels 11 and 12 that transport the refrigerant thus pass through each flat tube FR. The flat tubes FR are structurally identical, and are led in parallel beneath the battery modules B1 through B4. Each flat tube FR has a heat-conducting contact surface F1 and F2 with the battery modules B1 through B4 (see FIG. 6). Due to the mentioned identical construction of the flat tubes FR and of the battery modules B1 through B4, the contact surfaces F1 and F2 are identical. In addition, the longitudinal orientation I1 of the battery modules B1 through B4 is perpendicular to the longitudinal orientation I2 of the flat tubes.

Figure 6:
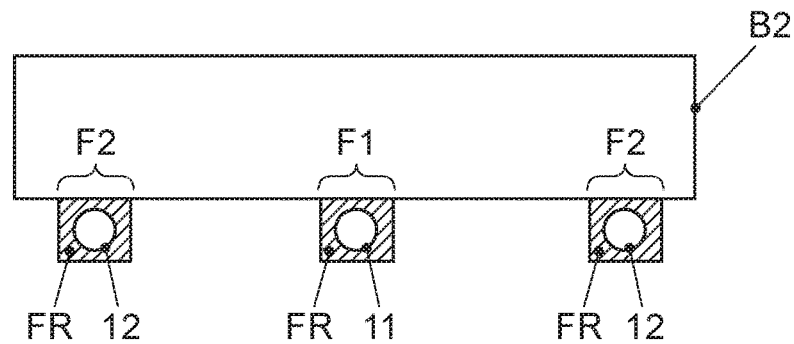
FIG. 6 shows a sectional view according to section VI from FIG. 4.

The middle flat tube FR visible in FIGS. 4 and 6 has a channel 11 that leads to a connecting element 13. In addition, two outer flat tubes FR with one channel 12 each are present which return a refrigerant, which is conducted via the channel 11 to the connecting element 13, in the opposite direction. The connecting element 13, which is designed as a collecting tube in the exemplary embodiment, thus connects the refrigerant supply channel 11 to the refrigerant return channels 12.

In a departure from the exemplary embodiment, it is conceivable for each of the flat tubes FR to also have multiple channels.

For carrying out the method according to the invention with the power limits specifically present in FIG. 3, the cooling arrangement is now designed as follows:

If an available cooling power $P_V$ is present that is in the power range LB1, no mass flow of refrigerant is conducted into the channel 11 via an inlet, not denoted by a reference numeral. Thus, no cooling of the traction battery T takes place.

If an available cooling power $P_V$ is present in the power range LB2, the mass flow of the refrigerant is regulated in such a way that the traction battery T is cooled with a cooling power $P_{actual}$ of 1 kW. In the exemplary design of the cooling arrangement, the quantity of refrigerant that passes into the supply channel 11 is now such that in the channel 11, the refrigerant is not completely evaporated until it is in a first evaporation region V1 that is downstream from the battery modules B1 through B4 in the flow direction of the refrigerant. Homogeneous heat dissipation between the traction battery T and the channel 11 may thus be ensured over the entire length of the channel 11 by a sufficient quantity of refrigerant that is present but not yet evaporated. Temperature spreads between the battery modules B1 through B4 or between their individual cells do not occur.

The refrigerant that has evaporated in the evaporation region V1 then passes into the connecting element 13 and is transported back via the return channels 12 to outlets, not denoted by reference numerals. During the return, the refrigerant absorbs no additional heat due to its already gaseous state, and thus no longer produces a change, or at least an appreciable change, in the temperature level of the traction battery T.

However, if the available cooling power $P_V$ passes into the third power range LB3, the mass flow of the refrigerant is abruptly increased in such a way that a cooling power $P_{actual}$ for the battery cooling is raised to 3 kW. The refrigerant flow is then so great that the refrigerant has not already completely evaporated in the first evaporation region V1, and instead, refrigerant that is still liquid passes into the connecting element 13, and from there into the return channels 12, and is transported back through the channels 12. In the process, the refrigerant continues to absorb heat of the traction battery T, provided that in the channels 12 it has not completely evaporated until it is in a second evaporation region V2.

The cooling arrangement is thus designed in such a way that, when carrying out the method according to the invention, at no location beneath or between the battery modules B1 through B4 does complete evaporation of the refrigerant, and thus local overheating, occur which could result in impermissible or harmful temperature spreads.

In the exemplary embodiment shown, the cooling arrangement is also designed in such a way that a cooling power ratio of the first effective power stage I in the power range LB2 to the second effective power stage II in the power range LB3 of 1:3 results.

The division of the cooling power $P_{actual}$ in such a ratio fulfills the expected requirements for a simple and thus cost-effective design of the cooling arrangement, since it is necessary to implement only one supply flat tube FR and two return flat tubes FR. In addition, a complicated temperature sensor system may be avoided with such a cooling arrangement.

Alternatively, other ratios of the cooling power $P_{actual}$ are also conceivable. Thus, for example, it is conceivable to provide two supply channels 11' and only one return channel 12' (also see FIG. 4). In such an embodiment, a ratio of the cooling power $P_{actual}$ in the stated power ranges LB2 and LB3 of 2:3 results. Such a graduation may be very appropriate in some applications.

Figure 5:
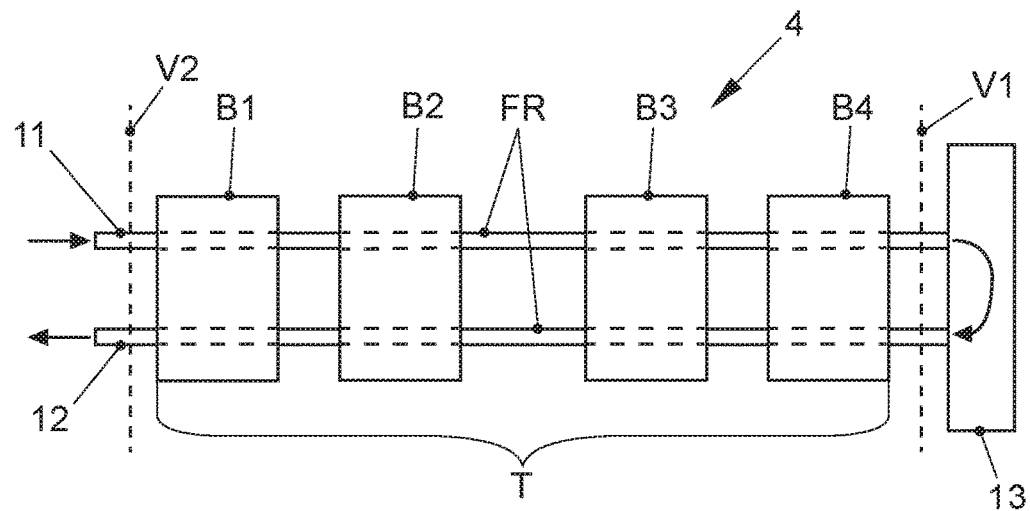
FIG. 5 shows a cooling arrangement for carrying out the method, in a second embodiment.

With reference to FIG. 5, a cooling arrangement is illustrated in which, in contrast to FIG. 4, only one flat tube FR with a supply channel 11 and one flat tube FR with a return channel 12 are present. A 1:2 ratio of the cooling power $P_{actual}$ may be achieved with this embodiment.

For example, in conjunction with the configuration according to FIG. 5, it is conceivable to design the method in such a way that with regard to the available cooling power $P_V$, a first power range LB 1 of 0 kW to 1.5 kW, a second power range LB2 of 1.5 kW to 3 kW, and a third power range LB3 above 3 kW are achieved in terms of control.

If the available cooling power $P_V$ in the first, lower power range LB1 drops, once again the mass flow of the refrigerant is controlled to 0 and the traction battery T is not cooled at all. For an available cooling power $P_V$ in the power range LB2, cooling of the traction battery T takes place in a first cooling power stage with a cooling power $P_{actual}$ of 1.5 kW. For an available cooling power $P_V$ in the third power range LB3, cooling of the traction battery T takes place in a second cooling power stage with a cooling power $P_{actual}$ of 3 kW.

Here as well, the coordinated design of the cooling arrangement contributes to the refrigerant in the channel 11 not being completely evaporated until it is in the evaporation region V1, for a cooling power $P_{actual}$ of 1.5 kW, and for a cooling power $P_{actual}$ of 3 kW, the refrigerant not being completely evaporated until it is in the channel 12, in particular in the evaporation region V2.

Lastly, FIG. 7 shows an electrically drivable motor vehicle K (electric vehicle) that has an evaporator 4 with a cooling arrangement illustrated according to FIG. 4. The traction battery T of the motor vehicle K may thus be cooled using the method according to the invention.

LIST OF REFERENCE NUMERALS

1 refrigerant circuit
2 compressor
3 condenser
4 evaporator
air conditioner
6 vehicle passenger compartment
7a, 7b cooling lines
8a, 8b node points
9 expansion valves
11, 11' supply channel
12, 12' return channel
13 connecting element; collecting tube
A air conditioning circuit
B battery cooling circuit
B1-B4 battery modules
F1, F2 heat-conducting contact surfaces
FR flat tubes
K electrically drivable motor vehicle
I1,I2 longitudinal orientation
LB1-LB3 power ranges
LBX power range
$P_G$ overall cooling power
$P_{actual}$ cooling power with which the battery is cooled
$P_K$ air conditioning cooling power
$P_V$ available cooling power for the battery cooling
$P_{XU}$ lower limit value of the power in the power range LBX
S1-S7 steps
t time
t1-t3 points in time
T traction battery
V1 first evaporation region
V2 second evaporation region
0 noncooling power stage
I cooling power stage
II cooling power stage

The invention claimed is:

1. A method for cooling a traction battery of an electrically drivable vehicle, the method comprising:
    utilizing a refrigerant as cooling medium,
    directing the refrigerant, in a mass flow of specified magnitude, along the traction battery through at least one channel, wherein the at least one channel is in heat-conducting connection with the traction battery;
    determining an available cooling power for cooling the traction battery; and
    regulating the magnitude of the mass flow of the refrigerant as a function of the available cooling power, such that either:
        no cooling power is delivered to the traction battery, or
        cooling power in each case is delivered to the traction battery, wherein the cooling power assumes one of multiple cooling power stages as a function of the available cooling power.

2. The method according to claim 1, further comprising dividing the available cooling power for the battery cooling into multiple power ranges, wherein at least one lower limit value is associated with each power range, and each power stage corresponds to the lower limit value of a specific power range.

3. The method according to claim 2, wherein the total amount of power stages is three predetermined power stages.

4. The method according to claim 3, further comprising dividing the available cooling power for the battery cooling into three power ranges, wherein:
    in a first power range, the available cooling power is less than 1 kW,
    in a second power range, the available cooling power is greater than 1 kW but less than 3 kW, and
    in a third power range, the available cooling power is greater than 3 kW,
    wherein a first power stage does not cool the traction battery at all, a second power stage cools the traction battery with 1 kW, and a third power stage cools the traction battery with 3 kW.

5. The method according to claim 2, further comprising setting the cooling power to be delivered in each case in the cooling power stages as a function of the temperature of the traction battery, wherein the ratio of the cooling power to be delivered in the cooling power stages remains constant.

6. A cooling arrangement for carrying out the method according to claim 1, wherein the traction battery has multiple battery modules, the method comprising:
    directing a refrigerant through at least two channels along the battery modules, perpendicularly with respect to the battery modules' longitudinal orientation, wherein the at least two channels are in heat-conducting connection with the battery modules,
    directing the refrigerant in at least one supply channel along the battery modules in a first direction to at least one connecting element,
    returning the refrigerant in at least one return channel along the battery modules in a second direction, wherein the first and second directions are oriented in parallel to one another, and wherein the connecting element fluidically connects the at least one supply channel to the at least one return channel, and
    operating the cooling arrangement in an operating mode in which the traction battery is cooled solely in the power stages, wherein in each power stage the refrigerant either:
        has already completely evaporated in the area of the connecting element after being led through the at least one supply channel,
        is completely evaporated in the area of the connecting element, or
        is not evaporated until it has completely returned via the at least one return channel.

7. The cooling arrangement according to claim 6, wherein in that the at least two channels are each in heat-conducting connection with the battery modules of the traction battery via a heat-conducting contact surface in such a way that an area ratio of the total contact surface of the at least one supply channel to the total contact surface of the at least one return channel of 1:1, 1:2, or 2:1 results.

8. The cooling arrangement according to claim 7, wherein in that dimensions of each channel and of each battery module are the same, and the number of the at least one supply channel, the method further comprising selecting a number of the at least one return channel in such a way that a ratio of the at least one supply channel to the at least one return channel is 1:1, 1:2, or 2:1.

9. The cooling arrangement according to claim 8, further comprising selecting one supply channel and two return channels.

10. The cooling arrangement according to claim 8, further comprising selecting two supply channels and one return channel.

11. The cooling arrangement according to claim 6, further comprising cooling the traction battery in the operating mode solely in two power stages.

12. An electrically drivable vehicle, characterized by at least one cooling arrangement according to claim 6.

* * * * *